United States Patent [19]
Crosbie et al.

[11] 3,851,411
[45] Dec. 3, 1974

[54] FOOTWEAR EMBODYING FABRICLESS THERMOPLASTIC COUNTER

[75] Inventors: Richard B. Crosbie, Woodbury; Thomas A. Byra, Waterbury, both of Conn.

[73] Assignee: Uniroyal, Inc., New York, N.Y.

[22] Filed: Nov. 19, 1973

[21] Appl. No.: 417,320

[52] U.S. Cl. .................................................. 36/68
[51] Int. Cl. ............................................ A43b 13/42
[58] Field of Search .......................... 36/68, 80, 69

[56] References Cited
UNITED STATES PATENTS

| 2,821,032 | 1/1958 | Helfet ................................... 36/68 |
| 3,174,236 | 3/1965 | Field ..................................... 36/68 |
| 3,427,733 | 2/1969 | Beckwith ............................. 36/68 |

Primary Examiner—Patrick D. Lawson
Attorney, Agent, or Firm—James J. Long

[57] ABSTRACT

A homogeneous fabricless footwear counter made of a thermoplastic blend of monoolefin copolymer rubber (e.g., EPDM, 60 parts) and polyolefin plastic (e.g., polypropylene, 40 parts) has unique anti-slip properties.

5 Claims, 3 Drawing Figures

PATENTED DEC 3 1974　3,851,411

FOOTWEAR EMBODYING FABRICLESS THERMOPLASTIC COUNTER

This invention relates to footwear embodying a fabricless thermoplastic counter.

Footwear is normally provided with an internal stiffening member in the heel area, called a counter, which is shaped to conform to the heel of the wearer; the counter aids in maintaining the shape of the shoe at the heel and provides frictional resistance to movement of the shoe of the wearer's heel while walking.

Conventional counter assemblies frequently include fabric layers which complicate manufacture and add to the cost of shoes, and have other disadvantages. Various attempts have been made to dispense with fabric (e.g., U.S. Pat. Nos. 2,720,042, Marcy, Oct. 11, 1955; 3,711,969, Weinstein, et al., Jan. 23, 1973) but such attempts unfortunately have met with various objections, including insufficient foot-to-counter friction to prevent the shoe from slipping unless a flock coating is employed.

In accordance with the invention a new fabricless counter is provided, suitable particularly for use in conventionally made fabric footwear which ordinarily includes vulcanizable rubber parts. The counter is made of a thermoplastic blend of a monoolefin copolymer rubber and polyolefin plastic. It has surprisingly been found that a fabricless counter made of such a thermoplastic blend has unique anti-slip properties in combination with other desirable qualities (stiffness, abrasion resistance, and ability to take a permanent set at temperatures used in curing the rubber parts of footwear); no special processing of assembly operations are required to achieve the requirements for a shoe counter.

The invention will be described with reference to the accompanying drawing, wherein.

Figure 1:
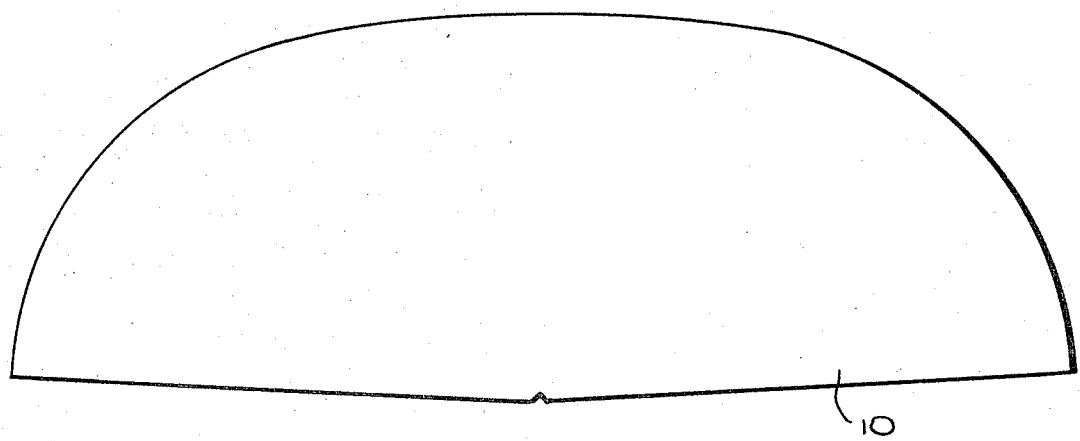
FIG. 1 is a plan view of a counter blank die cut from an extruded sheet of the thermoplastic blend.

The counter of the invention made from the described thermoplastic blend negates the need for a fabric backing because of the surprising unique anti-slip property of the thermoplastic material. The use of a thermoplastic material without a fabric backing eliminates the scrap loss encountered with fabric backed counter materials.

At present, conventional fabric footwear frequently uses a counter made by spread coating a drill fabric with a solution of chlorosulfonated polyethylene elastomer, drying and winding the fabric (in place of the spread coat, a drill fabric may be friction coated with a polyvinyl chloride-nitrile rubber blend), thereafter coating the back side of the drill fabric with a natural rubber cement, and again drying and winding the fabric. A rag compound is calendered to the cemented side, and counter blanks subsequently die cut from this stock and stitched into fabric uppers. Scrap and off-standard material cannot be re-worked but must be discarded. These conventional counters tend to vary objectionably from sheet to sheet in gauge and degree of cure. The fabric backing is used in this type of counter to provide abrasion resistance and to provide a base for the chlorosulfonated polyethylene elastomer or polyvinyl chloride-nitrile rubber blend which gives the counter its frictional characteristics.

Two common types of available thermoplastic counters are extruded ethylene-vinyl acetate copolymer with fabric backing and extruded semi-rigid polyvinyl chloride with fabric backing. The fabric backing is used in these conventional types of counter because it provides a frictional surface to keep the shoe from slipping off the heel and it acts as a barrier to keep the skin from contact with organic stabilizers. Because fabric is necessary in these counters, the ability to reuse scrap commonly associated with thermoplastics is lost.

Because the thermoplastic counter of the invention has a unique anti-slip property, there are several distinct advantages in the new counter. Since no fabric backing is required, the invention allows for the complete reworking of all scrap, with resulting substantial cost savings. The resistance to abrasion of the thermoplastic is significantly higher than that of fabric. Consequently, the new counter does not wear through in use. Furthermore, the material does not shrink when subjected to washing, unlike counters containing fabric which become misshaped due to fabric shrinkage.

There are no color limitations on the new counter material.

The new counter has a flex life higher than that of a conventional counter; whereas a conventional standard flex life is 10,000 flexes, the new thermoplastic counter survives 100,000 flexes without failure (determined on 1 inch by 4 inch samples, flexed 180°).

The new counter can be lasted on the same equipment as is presently used. As indicated previously, the counter is particularly suitable for use in conventionally made fabric footwear.

As indicated, the counter of the invention is based on a blend of (a) monoolefin copolymer rubber and (b) polyolefin plastic. The monoolefin copolymer rubber (a) employed in the blend is an amorphous, random, elastomeric copolymer of two of more monoolefins, with or without a copolymerizable polyene. Usually two monoolefins are used, but three or more may be used. Ordinarily one of the monoolefins is ethylene while the other is preferably propylene. However other alphamonoolefins may be used including those of the formula $CH_2$=CHR where R is an alkyl radical having for example 1 to 12 carbon atoms (e.g., butene-1, pentene-1, hexene-1, 4-methylpentene-1, 5-methylhexene-1, 4-ethylhexene-1, etc.). While the monoolefin copolymer rubber may be a saturated material, as in ethylene-propylene binary copolymer rubber (EPM) it is ordinarily preferred to include in the copolymer a small amount of at least one copolymerizable polyene to confer unsaturation on the copolymer (as in EPDM). Although conjugated dienes such as butadiene or isoprene may be used for this purpose (British Pat. No. 983,437; Belgian Pat. No. 736,717, Sumitomo Chemical Co. Jan. 29, 1970) in practice it is usual to employ a non-conjugated diene, including the open-chain non-conjugated diolefins such as 1,4-hexadiene (U.S. Pat. No. 2,933,480 Gresham et al., Apr. 19, 1960) or a cyclic diene, especially a bridged ring cyclic diene, as in dicyclopentadiene (U.S. Pat. No. 3,211,709, Adamek et al., Oct. 12, 1965), or an alkylidene norbornene as in methylene norbornene or ethylidene norbornene (U.S. Pat. No. 3,151,173, Nyce, Sept. 29, 1964), as well as cyclooctadiene, methyltetrahydroindene, etc. (see also such as U.S. Pat. Nos. 3,093,620 and 3,093,621; also 3,538,192 col. 6, line 49 to col. 7, line 51). The polyenes employed are not limited to those having only two double bonds, but include those having three or more double bonds. Usually the copolymer contains up to about 20% of the polyene, the remainder being from about 50 to about 80% ethylene and from about 50 to about 20% of the other alpha-olefin (by weight).

The polyolefin resin (b) with which the monoolefin copolymer rubber (a) is mixed to make the blend is a solid, high molecular weight resinous plastic material made by polymerizing such olefins as ethylene, propylene, butene-1, pentene-1, 4-methyl-pentene, etc., in conventional manner. Thus, such polyolefins as polyethylene (either of the low density [e.g., 0.910–0.925 g/cc], medium density [0.926–0.940 g/cc] or high density [e.g., 0.941–0.965 g/cc] type) may be used, whether prepared by high pressure processes or low pressure processes, including linear polyethylene. Polypropylene is a preferred polyolefin plastic, having isotactic and syndiotactic forms. Frequently the density of polypropylene is from 0.800 to 0.980 g/cc. Largely isotactic polypropylene having a density of from 0.900 to 0.910 g/cc may be mentioned particularly. Crystalline block copolymers of ethylene and propylene (which are plastics distinguished from amorphous, random ethylene-propylene elastomers) can also be used. Included among the polyolefin resins are the higher alpha-olefin modified polyethylenes and polypropylenes (see "Polyolefins," N. V. Boenig, Elsevier Publishing Co., New York 1966).

The ratio of monoolefin copolymer rubber (a) to polyolefin plastic (b) employed in the counter blends may vary from 10/90 to 90/10, preferably from 30/70 to 80/20, more preferably from 50/50 to 80/20, by weight. The higher ratios of rubber to resin are particularly suitable when inert fillers (e.g., surface treated calcium carbonate) are included in the composition.

If desired, the monoolefin copolymer rubber polyolefin plastic blend may be of the kind known as a thermoplastic elastomer. One thermoplastic elastomeric blend of this kind may be made by partially curing or cross-linking the monoolefin copolymer rubber by heating it at curing temperature with a small amount of a cross-linking agent, before blending the rubber with the polyolefin plastic (see U.S. Pat. No. 3,758,643 Fischer, Sept. 11, 1973, the disclosure of which is hereby incorporated herein by reference). This may be described as a thermoplastic reprocessable blend of (a) a rubbery monoolefin copolymer, said copolymer being partially cross-linked, prior to blending, to a gel content of at least 30% but less than 90% by weight measured by immersion in cyclohexane for 48 hours at 73°F., and (b) a resinous polyolefin. Such a thermoplastic rubber may also be provided by partially curing or cross-linking a blend of (a) and (b) while dynamically working, as in a Banbury mixer, the blend in admixture with a small amount of curative or cross-linking agent at curing temperature (see copending application Ser. No. 171,328, Fischer, filed Aug. 12, 1971, now U.S. Pat. No. 3,806,558, issued Apr. 23, 1974, the disclosure of which is hereby incorporated herein by reference). This method may be described as comprising mixing monoolefin copolymer rubber, polyolefin plastic and a curative therefor, and masticating and shearing said materials at curing temperature to produce a partial cure insufficient to render the blend unprocessable, the resulting partially cured blend having a gel content of from 60 to 93% by weight measured in cyclohexane at 73°F., the said blend being repeatedly reprocessable, and having the characteristics of a thermoplastic elastomer, whereby shaped articles having good physical properties may be made therefrom without requiring vulcanization. Furthermore, the thermoplastic elastomeric blend may also be made without any partial pre-cure of the monoolefin copolymer rubber and without dynamically partially cross-linking the blend, by employing in the blend a monoolefin copolymer rubber which has a high zero shear viscosity (see copending application Ser. No. 284,521, Fischer, filed Aug. 29, 1972 [corresponding to Belgain Pat. No. 778,309, issued Jan. 20, 1972], the disclosure of which is hereby incorporated herein by reference). Such a blend may be characterized as a mixture of (a) a rubbery monoolefin copolymer having a zero shear viscosity of at least $1 \times 10^9$ poises, determined from shear creep data at 135°C, and (b) a resinous high molecular weight -poly-alpha-monoolefin plastic. However, the use of partially pre-cured monoolefin copolymer rubber, or dynamically partially cross-linked blend, or the use of high zero shear viscosity monoolefin copolymer rubber, as in the described thermoplastic elastomers, is not necessary. The invention may simply be practiced, as described in the working example below, with a blend based on ordinary monoolefin copolymer rubber, which does not have a high zero shear viscosity, and without partial pre-cure of the rubber or dynamic partial cure of the blend.

Referring to the drawing, and particularly to FIG. 1, a counter blank 10 of suitable shape, according to the size and style of the shoe to be manufactured, may be die cut from a sheet of the thermoplastic material of suitable thickness, preferably an extruded sheet although the thermoplastic blend may also be calendered. At least one surface of the sheet is embossed with a fine texture to give a desirable appearance of fabric to the material. The textured surface becomes the exposed surface of the counter in contact with the heel of the wearer. However, it is preferable to emboss both surfaces of the sheet. Embossing both sides has two advantages: (1) It eliminates the possibility of the counter being stitched wrong side out. (2) It helps steady the counter blank against the fabric during stitching. For more efficient production, a number of sheets of counter blank stock are ordinarily plied up for simultaneous die cutting of a number of blanks. An advantage gained from the present material is the elimination of the need for release paper separating the plied up layers of counter stock. Release paper is required in conventional practice to prevent the plied layers from bonding to each other due to the pressure generated during die cutting.

The counter blank may be stitched into the back part (heel portion) of the shoe upper with the aid of standard fabric stitching equipment, and using the usual binding tapes which cover the exposed edges of counters in fabric footwear. If both sides of the counter blank are embossed, either side may be stitched down.

During final shoe assembly the upper is top cemented (using for example a one-fourth inch strip of natural rubber cement applied to the inside bottom edge of the upper; this serves to hold the upper to the insole when the upper is lasted) and mated with its insole and last. The upper may be fitted to the last by either a standard Kamborian or Bed laster. The counter blank is flexible enough that the act of lasting is sufficient to shape it. Consequently, no preforming operations on the counter blank are necessary; no preheating is necessary.

Figure 2:
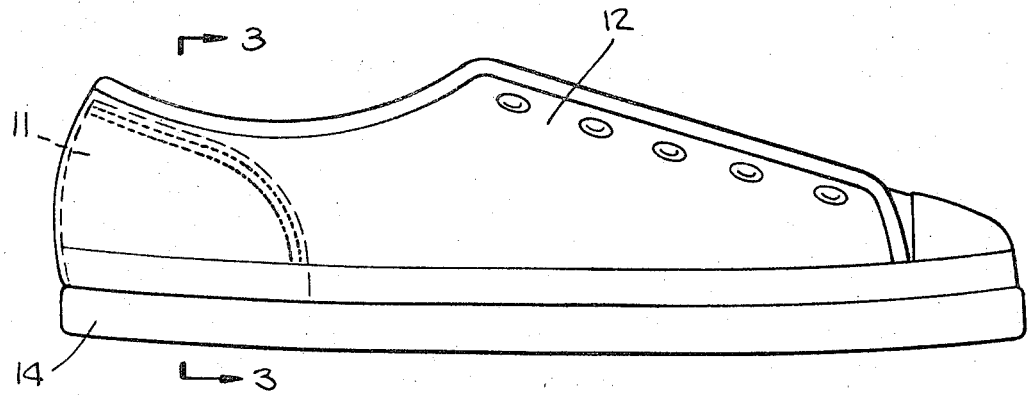
FIG. 2 is a side elevational view of a fabric shoe embodying the counter.
Figure 3:
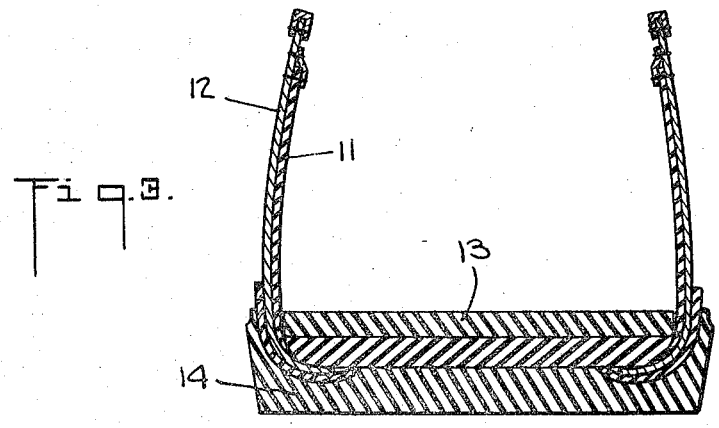
FIG. 3 is a transverse sectional elevational view along the line 3—3 of FIG. 2.

Upon completion of the shoe assembly, the shoes are subjected to vulcanizing conditions to cure the rubber parts, for example in an autoclave. The heat required to cure the shoe is sufficient to anneal the stresses incurred in the counter during lasting, thus giving the counter a permanent set in the desired shape. At the end of the curing cycle, the shoes are removed from the autoclave, stripped from the last, inspected and packed. Referring to FIGS. 2 and 3 of the drawing, the general relationship between a typical thermoplastic counter 11 of the invention, fabric upper 12, insole 13 and vulcanized rubber outsole 14 in the finished shoe may be seen. Subsequent exposure to heat incurred during machine washing or drying is insufficient to misshape the counter.

The following example will serve to illustrate the practice of the invention in more detail.

Example

The monoolefin copolymer rubber (a) employed is an EPDM, that is, a terpolymer of 47.5% ethylene, 47.5% propylene, and 5% dicyclopentadiene, by weight, Mooney viscosity 65 (ML-4 at 250°F.), gel content 3% (in cyclohexane, 48 hours at 73°F.). The polyolefin plastic (b) employed is a largely crystalline, isotactic polypropylene, melt flow index 4.0 (ASTM D123-58T, 230°C.), specific gravity 0.903, and 93% gel. 60 parts by weight of the rubber (a) and 40 parts of the plastic (b) are masticated in a Banbury mixer at 360°F. for about 5 minutes. 1 part of stabilizer (dilaurylthiodipropionate) is added and blended in. The batch is then mixed with 0.5 part of iron oxide as a pigment and another 5 parts of polypropylene. The resulting thermoplastic blend is extruded to a sheet of 0.050 ± 0.003 inch thickness. Both surfaces of the sheet are embossed with a fine texture to give a desirable appearance of fabric to the material. Sheets of the embossed counter stock are plied up and counter blanks are die cut. The counter blank is stitched into the back (heel) part of a fabric shoe upper. The upper is top cemented and mated with its insole and last. Upon completion of the shoe assembly the shoe (still on the last) is placed in a pressurized steam autoclave and cured under the following conditions:

| | |
|---|---|
| Temperature | 265°F. |
| Cycle time | 60 minutes |
| Pressure | 26 pounds air |
| | 4 pounds ammonia |
| Total pressure | 30 PSI |

A principal advantage of the invention centers around the good anti-slip properties attained with a thermoplastic homogeneous counter material. This is quite unexpected since plastic-like sheet materials would normally be unacceptable on the basis that they are slippery and thus require a fabric traction surface. The present counter material has good surface drag (non-slip properties, heel holding power or heel traction) so that the heel of the foot is held firmly in the shoe without the use of a facing fabric. The coefficient of sliding friction of the present counter material against stainless steel is 0.37 at 25/75 rubber/resin ratio, 0.45 at 40/60 ratio, 0.49 at 50/50 ratio, 0.71 at 60/40 ratio, 1.07 at 70/30 ratio, and 2.03 at 80/20 ratio.

Other advantages of such a homogeneous counter are also important. Desirable conservation of material is made possible through the reuse of all cutting scrap (after die cutting the counters) which may be put back into an original mix for re-extrusion. Cutting scrap from standard counter material containing fabric must be downgraded or discarded. Also such operational steps as laminating or calendar coating fabric to the plastic sheet are eliminated, thereby reducing the complexity and cost of the fabricating operations. In addition, the large inventory of various colored backing fabrics can be eliminated since the presently employed thermoplastic composition is readily pigmented to virtually any color which may be desired. The appearance of fabric need not be lost since the sheet material, being thermoplastic, is readily embossable.

There are definite advantages to the wearer of a shoe made using the present thermoplastic elastomeric material, over the conventional counters. The new counter has high abrasion resistance and will outwear fabric faced counters of the quality normally used in volume footwear since the fabric becomes highly abraded during wear. Wear tests have shown that the new counter retains its shape better during use than conventional fabric-backed counters. The new counter has high flex life; data show at least ten times the flex life over a standard grade of counter material.

The new counter is "shrink proof" since it does not contain fabric. This eliminates the buckling common in conventional counters after washing or when the shoes become wet during normal use (walking in puddles, etc.). For the boating shoe trade, it is desirable that the entire shoe be fast drying. The counter has heretofore been one area of the shoe which has been virtually impossible to make waterproof because of the fabric facing of the counter. Since the new counter is a homogeneous polymeric sheet, it cannot absorb water and thus fits ideally into the boating and yachting types of footwear.

We claim:

1. Footwear having a counter embodied in the heel portion of the upper, the said counter being a homogeneous thermoplastic fabricless counter made of a blend of (a) a monoolefin copolymer rubber and (b) a polyolefin plastic, in weight ratio of from 10/90 to 90/10, said counter providing stiffness at the heel and supplying frictional engagement with the heel of the wearer to help maintain the shoe in place on the foot.

2. In a shoe having a fabric upper and vulcanized rubber sole and a counter embodied in the heel portion of the upper, the improvement wherein the counter is a homogeneous thermoplastic fabricless structure comprising a blend of (a) a rubbery copolymer of ethylene and another alpha-olefin in weight ratio of from 50/50 to 80/20, said copolymer containing up to 20% of a copolymerizable non-conjugated diene, and (b) a resinous polyolefin plastic, the weight ratio of (a)/(b) being from 30/70 to 80/20, whereby the counter provides frictional engagement with the heel of the wearer to maintain the shoe in contact with the foot.

3. A fabric-and-rubber shoe having, in the inside of the heel portion of the upper, a counter which is a homogeneous thermoplastic fabricless blend of (a) an unsaturated rubbery terpolymer of ethylene, propylene, and a copolymerizable non-conjugated diene, the ratio of ethylene to propylene being from 50/50 to 80/20 by weight and the diene content being not greater than 20% by weight, and (b) polypropylene plastic, the ratio of (a)/(b) being from 50/50 to 80/20, by weight, said counter being characterized by the ability to withstand washing and providing frictional engagement with the heel of the wearer.

4. A fabric-and-rubber shoe as in claim 3 in which the said diene in (a) is dicyclopentadiene.

5. A fabric-and-rubber shoe as in claim 3 in which at least the exposed surface of the counter on the inside of the shoe in contact with the wearer's heel is embossed with a fabric-like surface texture.

* * * * *